July 21, 1942.  R. T. HEDFIELD ET AL  2,290,328
GAUGE HOUSING CONSTRUCTION
Filed Feb. 29, 1940   3 Sheets-Sheet 1

Inventors
Reynold T. Hedfield
and Alexander D. Rose.
By Thiess, Olsen & Mecklenburger Attys.

July 21, 1942.  R. T. HEDFIELD ET AL  2,290,328
GAUGE HOUSING CONSTRUCTION
Filed Feb. 29, 1940  3 Sheets-Sheet 2

Inventors.
Reynold T. Hedfield
and Alexander D. Rose
By Thiess, Olsen & Mecklenburger
Attys.

July 21, 1942.  R. T. HEDFIELD ET AL  2,290,328
GAUGE HOUSING CONSTRUCTION
Filed Feb. 29, 1940  3 Sheets-Sheet 3

Inventors:
Reynold T. Hedfield
and Alexander D. Rose.
By: Thiess, Olson & Mecklenburger, Attys.

Patented July 21, 1942

2,290,328

UNITED STATES PATENT OFFICE 2,290,328

GAUGE HOUSING CONSTRUCTION

Reynold T. Hedfield, Chicago, and Alexander D. Rose, Des Plaines, Ill., assignors to Jas. P. Marsh Corporation, Chicago, Ill., a corporation of Illinois Application February 29, 1940, Serial No. 321,454

7 Claims. (Cl. 73—369)

This invention relates to testing instruments, and more particularly to pressure-operated testing instruments such as thermometers and the like.

This instant application is a continuation in part of our application Serial No. 203,484, filed April 22, 1938, and entitled "Gauge housing construction."

An object of the invention is to provide a so-called distance reading thermometer whereby accurate reading of temperature may be made either at the point of temperature or remote therefrom.

The invention is more specifically directed to a testing instrument and housing therefor which may be of comparatively few parts, which may be easily manufactured and assembled, and which will be convenient in use and also will enable convenient access to any part of the interior thereof.

A further object is to provide a comparatively small, compact testing instrument, preferably having an elongated, flexible pressure conducting element which normally may be stored within the housing and easily extended therefrom when the instrument is to be used. The element may comprise a capillary tube and may have a thermostatic bulb associated therewith, and the bulb may also be stored within the housing if desired.

A further object is the provision of a substantially dust-proof housing for testing instruments, in which separate compartments are provided for various elements of the device, and in which removable or extensible portions may be stored within the housing and may be easily accessible without disturbing the operating mechanism of the device.

An important feature of the invention is the provision of a new and novel housing, preferably of sheet metal, in which all of the elements, including the extensible portions and operating accessories, may be assembled in a manner to occupy very little space and thereby enable the construction of a comparatively small compact instrument. The device may, of course, be made in any suitable size, but is particularly adapted for comparatively small and compact testing instruments which may be packed in a workman's service kit and will occupy very little space therein.

Further objects will be apparent from the specification and the appended claims.

Figure 3:
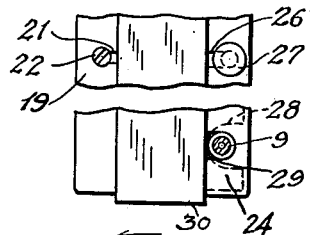
Fig. 3 is a fragmentary side elevation of the housing shown in Fig. 1 which illustrates a manner of securing the rear cover and front bezel, and which also illustrates one form of opening arranged to enable the capillary tube to be extended from the housing.
Figure 4:
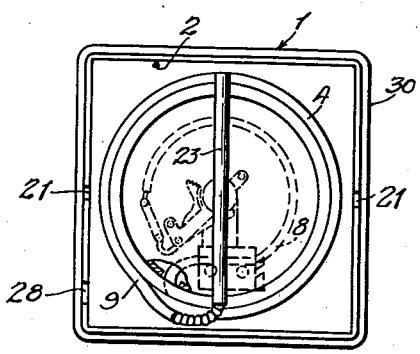
Fig. 4 is a rear elevation of the embodiment illustrated in Figs. 1 and 2 with the back cover removed.
Figure 5:
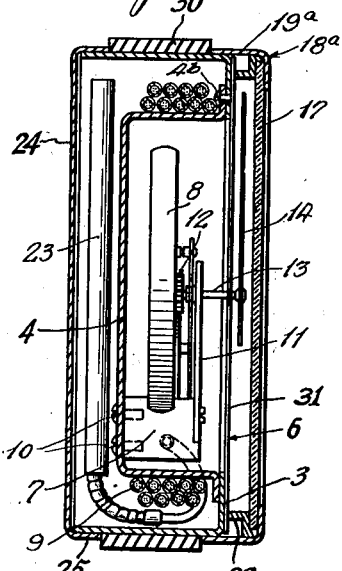
Fig. 5 is a vertical axial section similar to that shown in Fig. 2, but illustrating a construction in which a larger dial may be used.

Referring to the drawings in detail, the embodiment illustrated in Figs. 1 to 4, inclusive, comprises a housing 1 having a body portion 2, preferably of sheet metal, and having a wall 3 and a depressed cylindrical portion 4 therein forming a cup-shaped chamber 5 opening from the wall of the body portion. The outer contour of the body portion 2 may be preferably rectangular, while the cup-shaped portion 4 is preferably cylindrical and of smaller diameter to provide a space between the walls in which a suitable capillary tube or other flexible member for controlling the device may be stored. The cup-shaped portion 4 may be a separate stamping provided with an outwardly extending flange 4a which may be secured to the wall 3 of the body portion 2 in any suitable manner, as by spot-welding, or by means of screws 4b, as shown in Fig. 5, to facilitate its easy removal. The chamber 5 formed thereby may receive a Bourdon tube indicator-controlling mechanism 6 supported therein.

The mechanism 6 may comprise a suitable base 7 having a passage therein to which one end of a Bourdon tube 8 is secured. A passage in the base 7 leads from the Bourdon tube and communicates with a flexible capillary tube 9, which is also secured to the base 7 and extends through a suitable opening in the wall of the cylindrical chamber 5. The base 7 may be secured to the rear wall of the chamber 5 in any suitable manner, such as by the screws 10.

Figure 1:
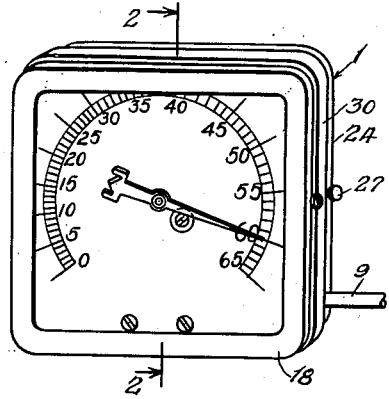
Fig. 1 is a perspective view of one embodiment of the invention as applied to a testing thermometer, and is illustrated with a portion of the capillary tube extending therefrom, the bulb portion being broken away.
Figure 2:
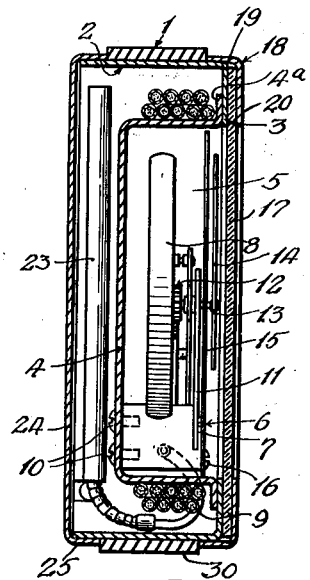
Fig. 2 is a vertical section through the embodiment illustrated in Fig. 1, taken on a line substantially corresponding to line 2—2 of Fig. 1, but with the capillary tube and the bulb enclosed in the housing.

The base 7 is provided with an upwardly extending frame or post 11 for supporting a transmission 12 to which the free end of the Bourdon tube is connected for operation of an indicator shaft 13. A suitable needle or hand 14 is secured to the shaft 13 and operates over a dial 15. In Fig. 2 the dial 15 is shown supported on the base 7 by means of screws 16.

Referring to Fig. 2, a cover member 17, preferably of glass or other suitable transparent material, is retained against the front face of the body portion 2 by means of a bezel 18. This bezel comprises a ring-like portion 19 conforming to the outer contour of the body portion 2 and arranged to telescope thereover. The bezel is also provided with an inturned flange 20 overlapping the transparency 17 and retaining it snugly against the wall 3 of the body 2. The bezel is also provided with slots 21 (Fig. 3) whereby it may be removably retained in position by means of screws 22 passing through the slots and threaded into the body portion.

The capillary tube 9 may be of any desired length and is usually provided with a thermostatic bulb 23. The back of the housing is provided with a sheet metal cover 24 having an inturned flange 25 arranged to telescope the body portion, said sheet metal cover being provided with slots 26 (Fig. 3) whereby it may be retained in place by thumb screws 27 threaded into the body portion. The cover may therefore be easily removed by loosening the thumb screws 27 and may snugly be retained in place thereby. The rear edge of the body portion 2 is provided with an open slot 28 the inner portion of which is coincident with a similar open slot 29 in the flange of the cover 24, and when the cover is in position on the body portion the slots are aligned as shown in Fig. 3 to provide a comparatively small opening to permit the capillary tube to be extended therethrough when desired.

A comparatively thick continuous band 30 of rubber or other suitable resilient material may be mounted snugly around the body of the device between the bezel ring portion 19 and the flange 25 of the cover 24. This band is for the purpose of providing a cushion of soft resilient material whereby the device may be placed upon any surface, such as the top of a refrigerator, without injury thereto. The band also protects the instrument in case of rough usage or when it is packed in a service kit. The flexible capillary tube 9 is of comparatively small diameter and is preferably covered over substantially its entire length with a soft flexible material, such as rubber tubing, although other coverings may be used.

The device may be used for distant temperature reading in any desired manner, such as in connection with household refrigerators, and the cover 24 may be removed by loosening the thumb screws 27, and the flexible capillary tube may be extended and the cover replaced with the tube extending through the opening formed by the slots 28 and 29. The instrument may be placed on top of the refrigerator, and the bulb 23 placed inside the refrigerator, and the door closed on the tube 9. The flexible material of the tube and the usual flexible strip on the refrigerator door make substantially an airtight joint.

Figure 6:
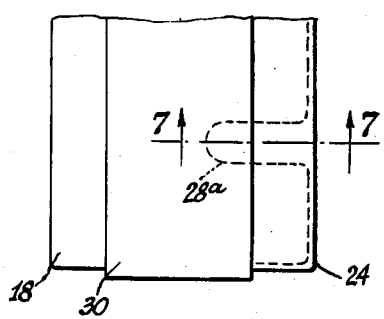
Fig. 6 is a fragmentary side elevation of that portion of the housing illustrated in Fig. 3, and illustrates a slightly different relationship of the opening for the capillary tube whereby the opening may be substantially dust-proof.
Figure 7:
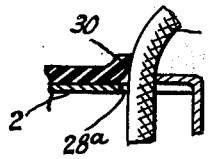
Fig. 7 is a detail sectional view taken on a line substantially corresponding to line 7—7 of Fig. 6, with the capillary tube extended from the housing and the cover replaced.

A preferred form of opening for enabling the tube to be extended from the housing 1 is illustrated in Figs. 6 and 7. In this construction a slot need not be provided in the cover 24. Instead, the slot is somewhat longer than previously described, as illustrated by dotted lines at 28a, so that it extends underneath the rubber band 30 and the opening is normally covered thereby. When the capillary tube 9 is extended through the opening as shown in Fig. 7, the rubber cushion 30 is bent outwardly as shown, and its natural resilience causes it to be pressed outwardly as shown. When the tube 9 is replaced within the casing, the cushion 30 completely closes the opening, making the housing substantially dustproof. The thermostatic bulb 23 may, of course, be of any desired shape, preferably of such dimensions that it may be enclosed within the housing when not in use. When the tube is replaced in the housing, it may be wound around the cup-shaped portion 4, as shown in Figs. 2 and 4, and the thermostatic bulb may be placed between the portion 4 and the cover 24.

The embodiment illustrated in Fig. 5 is in all respects similar to that shown in Fig. 2, with the exception that the flange 19a of the bezel 18 is somewhat wider and a larger dial 31 is supported against the wall 3 of the body portion 2. The dial is retained in position by means of a stepped ring or spacer 32 between the bezel and the wall 3. The ring 32 is preferably stepped, as illustrated, in order to support the cover glass 17 in spaced relation with the dial and to enable the needle 14 to operate therebetween. This embodiment enables the use of a materially larger dial and a somewhat more easily read scale.

Figure 8:
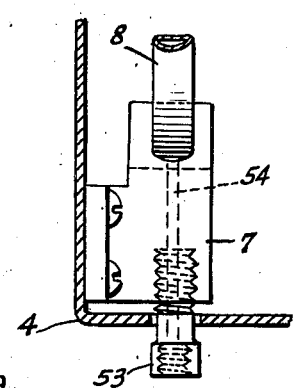
Fig. 8 is a fragmentary view illustrating an alternative pressure connection.

Fig. 8 illustrates a structure that embodies a connector 53 mounted in the base 7 and communicating with the Bourdon tube 8 by means of a passage 54 in the base. The connector 53 may be either internally or externally threaded for connection to a suitable pressure source. In some instances it may be desirable to use the instrument for indicating pressures rather than temperatures as do the instruments of Figs. 2 and 5. In the event that the instrument is to indicate pressure, the thermostatic bulb 23, which is in reality a pressure generating device when subjected to heat, is dispensed with and the source of the pressure to be measured is substituted for said bulb by a proper pressure-conveying conduit that may be flexible if desired. Or the pressure source may be connected by a proper conduit to the connector 53. When the instrument is used as a pressure-indicating means, the instrument may be screwed directly to the pressure source, or a flexible extension tube may be interposed between the pressure source and the coupling 53. This tubing may be provided with suitable threaded terminals and unscrewed from the coupling 53 and stored in the casing when not in use in the same manner as the capillary tube 9 previously described.

Figure 11:
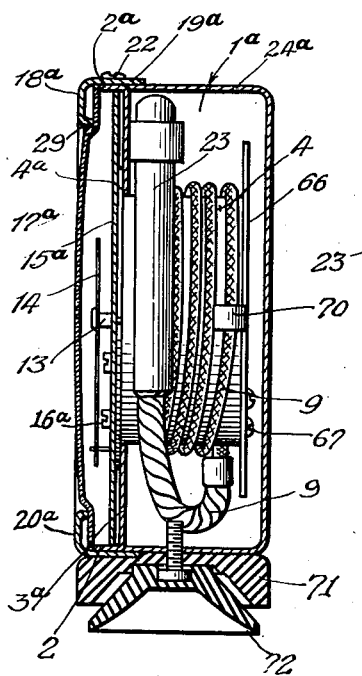
Fig. 11 is a vertical view, partially in section and partially in elevation, of the gauge structure of Figs. 9 and 10.
Figure 12:
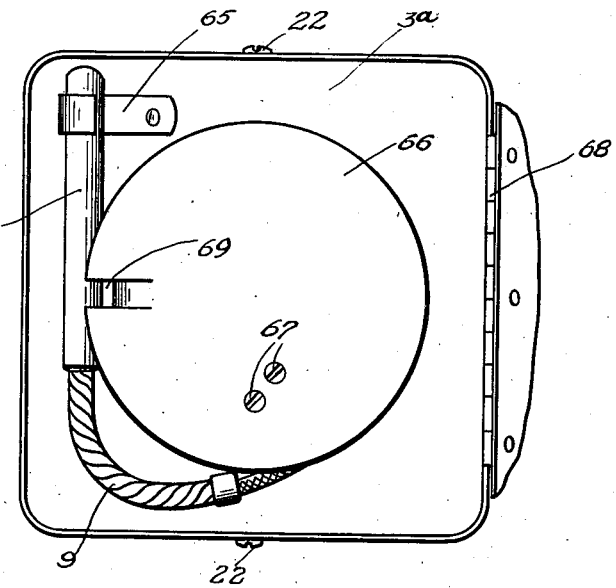
Fig. 12 is a rear elevation of a portion of the gauge structure shown in Figs. 9, 10 and 11, showing the manner in which the flexible conduit and the thermostatic bulb are normally wholly housed within the gauge structure when it is not in use.

In the modified structure shown in Figs. 9, 10, 11, and 12, elements appearing therein which correspond to those of the structures shown in Figs. 1 to 5, inclusive, are provided with corresponding reference characters. In the device illustrated in Figs. 10, 11, and 12, the reference characters 1a, 2a, 3a, 15a, 16a, 17a, 18a, 19a, 20a and 24a designate similar parts that are readily identified in Figs. 1 to 5, inclusive, of the drawings. In this modified structure the housing is capable of being made considerably thinner than those illustrated in Figs. 2 and 5, because the thermostatic bulb 23 is held in position, when not in use, by being inserted in a clip 65 that is secured, as shown in Figs. 11 and 12, to the rear of the wall 3a of the body portion 2a. The outwardly extending peripheral flange 4a formed on the cup-shaped member 4 is spot-welded to the outer face of the wall 3a. The dial 15a abuts the outer face of the flange 4a and is secured by screws 16a to the gauge post of the gauge mechanism that is housed in the cup-shaped member 4, all in a manner very similar to that shown in the structure of Fig. 2.

A cup-shaped portion 4 is provided at its rear wall with a circular plate or disc 66 that is secured thereto by means of screws 67. The periphery of the disc 66 extends beyond that of the cup-shaped portion 4 in order to retain the capillary tube 9 in position when it is wound upon the portion 4 which serves as a spool.

The cover 24a of the housing is of appreciable depth to contain completely the cup-shaped portion 4 when the body portion 2a, to which the rear cover 24a is hinged by the hinge 68, is placed in normal position, as shown in Fig. 11. It is to be noted that the depth of the cover 24a need not be of any greater extent than shown in Fig. 11, since the thermostatic bulb 23 is supported on the rear of the wall 3a rather than being interposed between the rear wall of the cup-shaped portion 4 and the cover 24 as shown in Figs. 2 and 5.

The outer periphery of the disc 66 is recessed at 69 to provide a bent-over projection or ear 70 which is designed to hold firmly in position the first convolution of the capillary tube 9 as it projects from the interior of the cup-shaped portion 4 wherein the gauge mechanism is housed.

Figure 9:
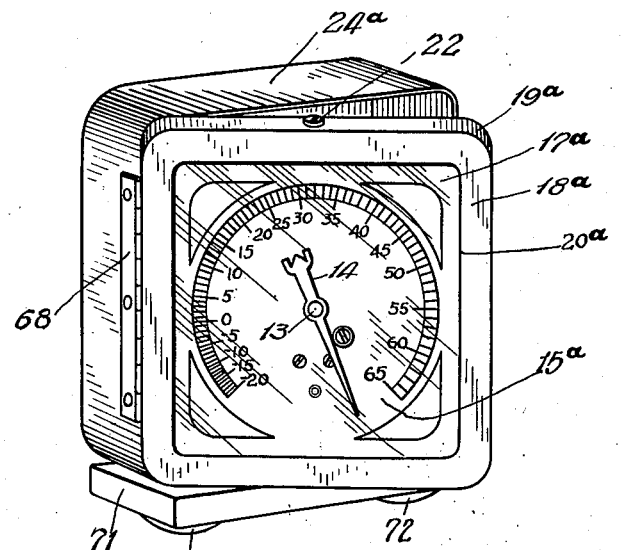
Fig. 9 is a perspective view of a modified form of our invention, showing particularly the front side of the gauge housing which constitutes the bezel assembly including the transparent member, the latter being disposed over the dial in order to expose the latter to view.
Figure 10:
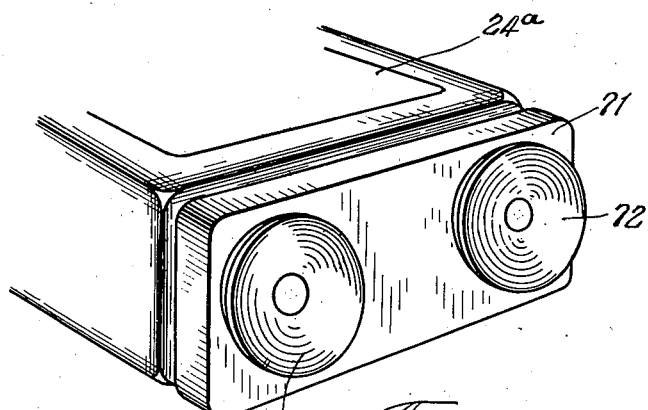
Fig. 10 is a perspective view showing the bottom of the gauge structure to which the sponge rubber pad is secured and vacuum cups for the purpose of firmly positioning the gauge structure where desired.

The cover 24a, as shown in Figs. 9, 10, and 11, is provided on its bottom face with a sponge rubber pad 71 and two spaced rubber vacuum cups 72. This rubber assembly enhances the appearance of the gauge housing, protects any surface upon which it may be disposed from being marred or scuffed by the sheet metal members, and allows the gauge housing to be retained firmly in position during use of the testing instrument.

The device shown in Figs. 9 to 12, inclusive, is essentially the same as the devices of Figs. 1 to 6, inclusive, except that the former is a more compact assembly since the thermostatic bulb 23 is positioned to come within the depth of the cup-shaped portion 4 when not in use. This construction allows the cover 24a to approach more closely the rear wall of the cup-shaped portion 4, thus cutting down appreciably the thickness of the housing.

Modifications may be made without departing from the spirit of the invention, and it is therefore desired that the invention be limited only by the prior art and the scope of the appended claims, it being understood that the invention is not limited to temperature indicators or recorders but is also applicable to other uses such as to measure, indicate, or record pressures.

Having thus described this invention, what is claimed and desired to be secured by Letters Patent is:

1. A portable testing instrument of compact construction comprising a housing providing two substantially concentric chambers that open from opposite sides of said housing and having a cover for each open side, one of said chambers providing a storage chamber comprising an annular space between the walls of both chambers, a gauge mechanism in one of said chambers, and an elongated flexible energy transmitting member operably connected to said mechanism and extending into said other chamber and normally stored in said annular space and having an enlarged terminal member likewise normally stored in said storage chamber, said housing having an opening to enable said elongated member to be extended therefrom.

2. A gauge housing construction comprising an inner casing having an open front, an outer casing surrounding the said inner casing and leaving the open front of the latter exposed to view, the rear wall of said inner casing constituting a cylindrical cup-shaped housing of lesser depth and lesser diameter than said outer casing to provide an annular hollow storage space between the opposed side walls of the two casings and a second storage space between the rear wall of the inner casing and coextensive with the rear wall of said outer casing, said annular storage space being adapted to store therein an elongated control member that may be coiled upon the said cylindrical cup-shaped housing and said second storage space being adapted to store therein the terminal member of said control member and said cylindrical cup-shaped housing being adapted to receive a gauge mechanism, a bezel assembly including a transparent member for closing the said open front of the inner casing, and means independent of said bezel assembly allowing access to said storage spaces to allow said elongated control member to be uncoiled and said terminal member to be placed at a remote point from the gauge housing.

3. A portable gauge of compact construction comprising an outer casing, an inner cup-shaped member housed therein and providing an inner chamber, a gauge mechanism housed within said inner chamber and supported upon said cup-shaped member, an indicating dial exposed to view, a bezel assembly including a transparent member that is disposed over said dial, said bezel assembly and said dial constituting the front side of the gauge where the dial is exposed to view, said outer casing supporting said inner cup-shaped member and providing a peripheral storage space around the outer side walls of the said inner cup-shaped member and another storage space between the rear of the said inner cup-shaped member and the rear inner wall of said outer casing, an elongated flexible conduit extending through the wall of said cup-shaped member and communicating at one end with the said gauge mechanism to which it is fixed, a thermal responsive element secured to the other end of said flexible conduit, said flexible conduit, when the gauge is not in use, being adapted to be wound upon the outer wall of said cup-shaped member to occupy said peripheral storage space and said thermal responsive element being adapted to be disposed within the said other storage space, and means providing access to said storage spaces to allow withdrawal of said flexible conduit and said thermal responsive element from their respective storage spaces, the outer casing being provided with an opening to allow said flexible conduit to pass through the wall thereof whereby the gauge, when in use, may be disposed in operative position at a point remote from the point where said thermal responsive element is placed.

4. A portable gauge of compact construction comprising an inner housing member providing a cup-shaped chamber having an open front, a gauge mechanism housed in said chamber and supported upon said inner housing member, a dial for the gauge located in the open front of said cup-shaped chamber so as to be exposed to view, an indicator co-operating with said dial, a bezel assembly including a transparent member disposed over said dial and indicator and holding said transparent member in fixed position to permit unobstructed observation of said dial and said indicator, an outer casing housing said inner housing member, said bezel assembly serving as a closure for the front side of said outer casing, a control member connected to said gauge mechanism and extending through a wall of said cup-shaped chamber and comprising an elongated flexible portion, a temperature responsive element connected to the free end of said flexible portion, the side wall of said cup-shaped chamber serving as a spool for storing said elongated flexible portion when wound thereupon, said outer casing supporting the gauge in upright position and normally enclosing said inner housing member and being spaced from the side wall and rear wall thereof to provide a peripheral storage space about said side wall for said flexible portion when coiled upon the spool and a storage space to the rear of said rear wall for said temperature responsive element, and means operable to permit access to said storage spaces whereby said flexible portion may be wound upon or unwound from the said spool and said temperature responsive element may be wholly housed within said outer casing.

5. A gauge housing of compact construction comprising an inner casing having an open front, an outer casing surrounding the said inner casing and leaving the open front of the latter exposed to view, the rear wall of said inner casing constituting a cylindrical cup-shaped housing of lesser diameter than said outer casing to provide a storage chamber including an annular storage space between the opposed side walls of the two casings, said annular storage space being adapted to store therein an elongated control member that may be coiled upon the said cylindrical cup-shaped housing, and said cylindrical cup-shaped housing being adapted to receive a gauge mechanism, a bezel assembly including a transparent member for closing the said open front of the inner casing, and means independent of said bezel assembly allowing access to said storage chamber to allow said elongated control member to be uncoiled and the terminal member associated with said elongated control member to be placed at a remote point from the gauge housing.

6. A portable gauge of compact construction comprising an outer casing, an inner cup-shaped member housed therein and providing an inner chamber, a gauge mechanism housed within said inner chamber and supported upon said cup-shaped member, an indicating dial exposed to view, a bezel assembly including a transparent member that is disposed over said dial, said bezel assembly and said dial constituting the front side of the gauge where the dial is exposed to view, said outer casing supporting said inner cup-shaped member and providing a storage chamber including a peripheral storage space around the outer side walls of the said inner cup-shaped member, an elongated flexible conduit extending through the wall of said cup-shaped member and communicating at one end with the said gauge mechanism to which it is fixed, a thermal responsive element secured to the other end of said flexible conduit, said flexible conduit, when the gauge is not in use, being adapted to be wound upon the outer wall of said cup-shaped member to occupy said peripheral storage space and said thermal responsive element being likewise adapted to be disposed within the said storage chamber, and means providing access to said storage chamber to allow withdrawal of said flexible conduit and said thermal responsive element, the outer casing being provided with an opening to allow said flexible conduit to pass through the wall thereof whereby the gauge, when in use, may be disposed in operative position at a point remote from the point where said thermal responsive element is placed.

7. A portable gauge of compact construction comprising an inner housing member providing a cup-shaped chamber having an open front, a gauge mechanism housed in said chamber and supported upon said inner housing member, a dial for the gauge located in the open front of said cup-shaped chamber so as to be exposed to view, an indicator co-operating with said dial, a bezel assembly including a transparent member disposed over said dial and indicator and holding said transparent member in fixed position to permit unobstructed observation of said dial and said indicator, an outer casing housing said inner housing member, said bezel assembly serving as a closure for the front side of said outer casing, a control member connected to said gauge mechanism and extending through a wall of said cup-shaped chamber and comprising an elongated flexible portion, a temperature responsive element connected to the free end of said flexible portion, the side wall of said cup-shaped chamber serving as a spool for the elongated flexible portion of said control member when the former is wound thereupon, said outer casing supporting the gauge in upright position and normally enclosing said inner housing member and being spaced from the walls of the latter to provide a storage chamber including peripheral storage space about said side wall for the flexible portion of said control member when the former is coiled upon the spool and storage space for said temperature responsive element, and means operable to permit access to said storage chamber whereby the flexible portion of said control member may be wound upon or unwound from the said spool and said temperature responsive element may be wholly housed within said outer casing.

R. T. HEDFIELD.
ALEXANDER D. ROSE.